United States Patent
Karmarkar et al.

(10) Patent No.: US 11,231,107 B2
(45) Date of Patent: Jan. 25, 2022

(54) SEAL STRUCTURE AND METHOD OF FORMING

(71) Applicant: Transportation IP Holdings, LLC, Norwalk, CT (US)

(72) Inventors: Uday Prakash Karmarkar, Erie, PA (US); Dennis Richter, Lawrence Park, PA (US); Krishna Kumar Gupta, Bangalore (IN); Jaime Jesus Garcia, Erie, PA (US); Erik W. Miller, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 63 days.

(21) Appl. No.: 16/691,845

(22) Filed: Nov. 22, 2019

(65) Prior Publication Data

US 2021/0156475 A1    May 27, 2021

(51) Int. Cl.
*F16J 15/02*    (2006.01)
*F16H 57/029*    (2012.01)
(Continued)

(52) U.S. Cl.
CPC ............. *F16J 15/027* (2013.01); *B33Y 80/00* (2014.12); *F16H 57/029* (2013.01); *F16H 57/0423* (2013.01); *F16J 15/3268* (2013.01)

(58) Field of Classification Search
CPC .......... F16J 15/46; F16J 15/027; F16J 15/025; F16J 15/024; F16H 57/0423; F16H 57/029
See application file for complete search history.

(56) References Cited

U.S. PATENT DOCUMENTS 3,912,286 A    10/1975    Kerschner
4,189,158 A *   2/1980    Roussin ............... F16J 15/3456
                                                        277/389
(Continued)

FOREIGN PATENT DOCUMENTS

DE    102004034208 A1    2/2006
EP        3333367 A1    6/2018
(Continued)

OTHER PUBLICATIONS

Extended European Search Report dated Apr. 4, 2021 for corresponding Application No. 20208691.4 (7 pages).

*Primary Examiner* — Jeremy R Severson
(74) *Attorney, Agent, or Firm* — The Small Patent Law Group LLC; Philip S. Hof

(57) ABSTRACT

A seal structure can include a protruding portion of an outer surface of a body. An inner surface of the protruding portion may define at least a portion of a channel. The protruding portion may be configured to engage and at least partially deform into the channel in response to a load generated by pressing an outer surface of the protruding portion against a contact surface of a contact member to provide a seal between the body and the contact member. The seal structure may be integrally formed within the body as a monolithic object. The body may face towards the contact surface of the contact member during operation of the seal structure. A method may include forming a monolithic body with an integral seal structure by additively fusing material so that the body has an outer surface facing towards a contact surface of a contact member.

20 Claims, 6 Drawing Sheets

(51) Int. Cl.
    *F16H 57/04*         (2010.01)
    *F16J 15/3268*     (2016.01)
    *B33Y 80/00*        (2015.01)

(56) References Cited

U.S. PATENT DOCUMENTS

| | | | | |
|---|---|---|---|---|
| 4,687,127 | A | * | 8/1987 | Pardo ............... F16J 15/027 248/27.1 |
| 6,506,135 | B2 | * | 1/2003 | Ou .................... A63B 41/08 156/172 |

FOREIGN PATENT DOCUMENTS

| | | | |
|---|---|---|---|
| EP | 3409522 | A1 | 12/2018 |
| EP | 3495226 | A1 | 6/2019 |

\* cited by examiner

SEAL STRUCTURE AND METHOD OF FORMING

BACKGROUND

Technical Field

The inventive subject matter described herein relates to structures that have seals for abutting corresponding contact members.

Discussion of Art

Mechanical seals may be utilized at the interface between two objects. The mechanical seals may be compliant and configured to deform and/or compress to fill the space between the two objects. A seal may provide a barrier to prevent materials, such as fluids, dust, and debris, from being transmitted across the seal. For example, the seal may block leakage of external material into the interface between the two objects and/or may block leakage of internal material from escaping out of the interface between the two objects. Mechanical seals may be used to join the two objects together or at least reduce movement and/or vibrations of the objects relative to each other. For example, a seal that is compliant and compressed between two objects may exert friction on the contact faces of the objects to reduce relative movement. The compliancy of the seal may allow the seal to absorb and dissipate vibrations from the objects.

Known mechanical seals may be discrete objects that are separate and distinct from the two objects that the seals engage and may have a different material composition than the two objects. For example, a common type of seal is an O-ring gasket, which may be formed of rubber or a rubber-like material that is more compliant than the contact surfaces of the two objects it seals. A sealed interface between the two objects may be provided by first affixing the seal (e.g., gasket) to a first object of the two objects, and then moving the two objects together at the interface such that the seal physically contacts the second object. The seal may be affixed to the first object via an adhesive, fit within a groove along the contact surface, held by a fastener (e.g., a clamp), or the like. The sealed interface between the two objects thus may require a lengthy manufacturing and assembly process that includes manufacturing or otherwise obtaining the first object, manufacturing or otherwise obtaining the seal, affixing the seal along the contact surface of the first object, and assembling the first object adjacent to the second object such that the seal physically contacts the second object to seal the interface. Furthermore, because the seal is a separate component from the first object to which it is affixed, leak paths may form between the seal and the first object which compromise the utility of the seal. Leak paths may form due to environmental conditions, such as expansion and/or contraction in the parts attributable to temperature changes and/or humidity. Leaks paths may form due to material changes in the parts over time due to aging. For example, the compliancy of the seal may decrease over time, which may enable the formation of leak paths. Leak paths may form due to the seal being moved out of the designated position on the first object, which may occur when the seal makes initial contact with the second object. It may be desirable to have a seal structure for sealing an interface between two objects that differs from the gaskets and mechanical seals that are currently available.

BRIEF DESCRIPTION

In one or more embodiments, a seal structure is provided that can include a protruding portion of an outer surface of a body. An inner surface of the protruding portion may define at least a portion of a channel. The protruding portion may be configured to engage and at least partially deform into the channel in response to a load generated by pressing an outer surface of the protruding portion against a contact surface of a contact member to provide a seal between the body and the contact member. The seal structure may be integrally formed within the body as a monolithic object. The body may be configured to face towards the contact surface of the contact member during operation of the seal structure.

In one or more embodiments, a vent plug is provided that can include the seal structure described above. The body may be configured to mate with a gear case and thereby form a seal. The body may be configured to define a path through which excess lubricant may flow out of the gear case in a controlled manner that does not allow lubricant to splash or spray out of the gear case during operation of the gear case.

In one or more embodiments, a method (e.g., for forming a seal structure) is provided that can include forming a monolithic body with an integral seal structure actively fusing material so that the body has an outer surface configured to face towards a contact surface of a contact member. The seal structure may have a protruding portion that protrudes outward from the outer surface of the body. The seal structure may be configured to engage and at least partially deform against the contact surface of the contact member to provide a seal between the body and the contact member. In inner surface of the protruding portion may define a channel that extends under the protruding portion and within the body. The channel is a seal volume that can be filled with a biasing agent. The biasing agent may be configured to respond to a load being applied to the protruding portion by resisting such deformation by a determined amount.

In one or more embodiments, a seal structure is provided that can include a body and a seal. The body may have an outer surface configured to face towards a contact surface of a contact member. The seal may be integral to the body such that the seal is seamlessly secured within the body to define a channel and a protruding portion of the outer surface of the body. The seal may be configured to engage in at least partially deform against the contact surface of the contact member in response to a load and thereby to provide a seal between the body and the contact member. The body and the seal may be composed of a stack of multiple layers fused together.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a seal structure and a method for forming the seal structure. The seal structure is formed within a body and is integral to the body to form a monolith. The seal structure is seamless and defines a channel. The channel may be open or closed, but most examples herein will refer to the closed channel embodiment. The seal structure includes a protruding portion of an outer surface of the body. When the body is placed against a contact member such that the outer surface faces a contact surface of the contact member at an interface, the portion of the seal structure that protrudes from the outer surface may extend across the interface to engage and at least partially deform against the contact surface to provide a mechanical seal between the body and the contact member. The seal structure may engage the contact surface by making physical contact with the contact surface. The seal structure at least partially deforms against the contact surface by deflecting and/or compressing between the outer surface of the body and the contact surface of the contact member. The protruding portion, then, deforms and at least partially collapses back into the channel that is below the protruding portion.

In one or more embodiments, the seal structure can be formed integrally to the body because the seal structure is formed in-situ at the same time as the body is built. That is, the seal structure may be formed concurrently with the formation of the body. For example, the seal structure and the body may be formed during a common additive manufacturing process in which the seal structure is formed in layers of material that are additively stacked and fused together.

The seal structure may prevent the ingress and/or egress of materials, such as fluids, dust, and debris, across the seal within the interface between the body and the contact member. Furthermore, the seal structure may provide a friction fit between the body and the contact member to support securing the body to the contact member, or at least reduce relative movement between the body and the contact member. Because the seal structure is integral to the body (e.g., seamlessly secured on the body), there is little, if any, risk of the formation of leak paths between the seal structure and the body, even when exposed to harsh environmental conditions and after experiencing aging. Furthermore, forming the seal structure to be an integral part of the body may provide efficient, cost-effective production of the seal structure. For example, instead of forming a discrete seal, forming a discrete body, and then coupling the seal to the body via adhesives, fasteners, friction-fits, or the like, the seal structure according to one or more embodiments may be formed during a single production process, such as an additive manufacturing process, in which the seal structure is concurrently formed with the body.

Figure 1:
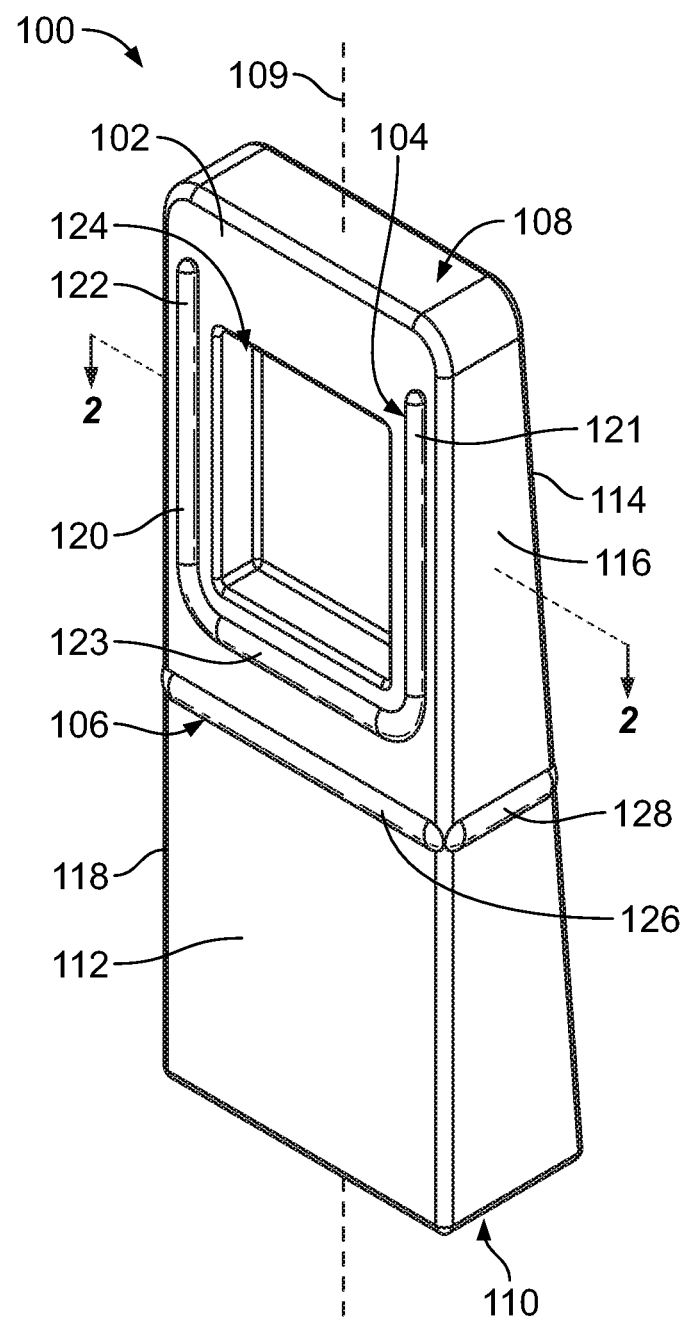
FIG. 1 is a perspective view of a seal structure according to one embodiment.

FIG. 1 is a perspective view of a splash guard 100 according to an embodiment. The splash guard is the body in this illustrative example. The splash guard is intended to mate with a gear case to control lubricant splash and is provided here as an example of an application for which the inventive seal structure can apply. The splash guard has a body 102. The body extends a length from a first end 108 to a second end 110 that is opposite the first end. The body includes a first outer surface 112, a second outer surface 114, a first side surface 116, and a second side surface 118. All four of the surfaces extend the length of the body from the first end to the second end. In the illustrated orientation, the first outer surface and the first side surface are shown. The second outer surface is opposite the first outer surface, and the second side surface is opposite the first side surface. Each of the first and second side surfaces extends from the first outer surface to the second outer surface.

In the illustrated embodiment, the splash guard includes multiple different seal structures, including a face seal 104 and a perimeter seal 106. The face seal and the perimeter seal are spaced apart from each other along a length of the body. The face seal is disposed along the first outer surface. The perimeter seal is disposed along at least the first outer surface and the first side surface, and optionally may extend along an entire perimeter of the body.

With regard to the face seal 104, it may provide a mechanical seal between the body and a contact member. In this example, the contact member is a gear case. When the body is oriented such that the first outer surface faces towards a contact surface of the contact member and the body is moved towards the contact member, the face seal makes initial physical contact with the contact surface prior to, or instead of, the first outer surface engaging the contact surface. The face seal may engage the contact surface of the contact member and at least partially deform against the contact surface to provide the mechanical seal between the body and the contact member. For example, face seal has a compliancy that allows the face seal to deflect and/or compress between the contact surface and the outer surface. As described herein, the compliant property of the face seal may be attributable to one or more characteristics, such as a thickness of a layer (or wall) that defines the seal, a cross-sectional shape of the seal, a material composition of the seal, and the presence or absence of internal support structures within the body that provide resilience to the seal. For example, a designated compliancy of the face seal may be achieved by modifying or selecting one or more of these characteristics.

Optionally, the body defines a flow path or cavity 124 that is open along the first outer surface and in this embodiment allows lubricant to flow therethrough. The face seal at least partially surrounds the cavity. In the illustrated embodiment, the cavity has a generally rectangular shape along the outer surface, and the face seal surrounds the cavity along three of the four edges of the cavity. Optionally, the face seal may surround a greater amount of the perimeter of the cavity, such as the entire perimeter of the cavity.

The face seal (seal structure) includes a protruding portion 120 of the first outer surface. The protruding portion is a raised or embossed feature that projects outward beyond the area of the first outer surface that surrounds the protruding portion. Thus, a portion of the face seal is raised relative to the first outer surface.

In the illustrated embodiment, the protruding portion of the face seal extends along the outer surface. In this example the face seal is generally in the form of a U-shape. Of note, there is a bend in the face seal that would preclude typical machining techniques (which rely on a series of linear holes, which can then be plugged to form an enclosure). Overmolding processes may require an insert to prevent material from flowing into any cavity underneath the protruding portion. A bend with an integral single piece may be formed through additive manufacturing processes described herein. In one embodiment, the seal structure (face seal and/or perimeter seal) and thus the channel bends and curves in three dimensions. That is, the contact surface may not be a flat or planar surface. In such an instance, the body and the seal structure may be adapted to follow, mate with, and seal to the non-planar contact surface of the contact member.

The protruding portion has a first elongated segment 121 proximate to the first side surface, a second elongated segment 122 proximate to the second side surface, and an intermediate segment 123 that extends from the first elongated segment to the second elongated segment to represent a bottom of the U-shape when the splash guard is oriented upright. The protruding portion may have curved corners at the connections of the segments.

With regard to the perimeter seal 106, it includes a perimeter seal protruding portion 126 of the first outer surface and includes a protruding portion 128 of the first side surface 116. The perimeter seal protruding portion is linearly elongated in a direction that is orthogonal to a long axis 109 (e.g., a length direction) of the body from the first end 108 to the second end 110. The perimeter seal continuously extends from the perimeter seal protruding portion to the protruding portion 128 on the first side surface. Thus, the perimeter seal 106 extends along multiple outer surfaces of the body, unlike the face seal 104. The protruding portion 128 is linearly elongated in a direction that is orthogonal to the long axis of the body. For example, the perimeter seal 106 may define a two-dimensional plane that is orthogonal to the long axis. The perimeter seal 106 optionally may continuously extend around the entire perimeter of the body. The perimeter seal 106 may be disposed between the face seal 104 and the second end 110 of the body. The perimeter seal 106 may support securing the splash guard in a fixed position relative to the contact member. For example, the body optionally has a wedge shape, such that the second end 110 is broader than the first end 108. The body may be configured to be inserted, with the first end leading, into a slot or other opening in a housing structure. As the body is moved into the slot, the perimeter seal may be configured to engage in physical contact interior surfaces of the housing structure. The perimeter seal may at least partially deform to provide a friction fit that resists movement of the body relative to the housing structure to secure the seal structure to the housing structure.

Both the face seal 104 and the perimeter seal 106 are integral to the body 102, such that each seal is seamlessly connected to the body. In one or more embodiments, both seals are formed in-situ on the body. The seals may be formed concurrently with the formation of the body, such as during a common additive manufacturing process. Although the splash guard in FIG. 1 includes one face seal and one perimeter seal, the seal structure according to one or more alternative embodiments may include one or more face seals only, one or more perimeter seals only, only one face seal and multiple perimeter seals, or multiple face seals and only one perimeter seal.

Figure 2:
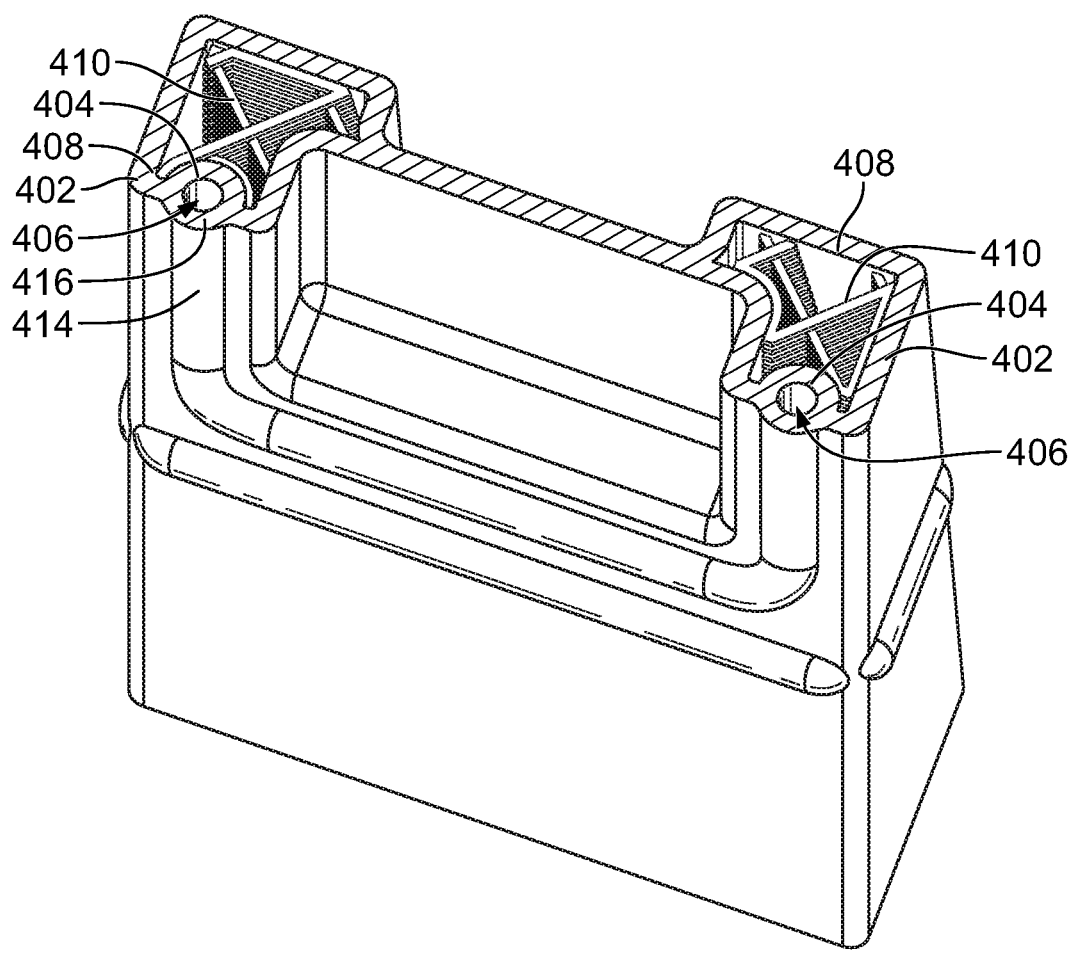
FIG. 2 illustrates the seal structure and a gear case according to an example application.

FIG. 2 is a cross-sectional view of the splash guard shown in FIG. 1. The cross-section is taken along line 2-2 in FIG. 1, which extends perpendicular to the long axis of the seal structure. The face seal further includes a channel 406 or tube defined by inner surfaces of the body. That is, the protruding portion has the outer contact surface 414 that is a subset of the body's outer surface, and it has an inner surface 416 that defines a portion of the channel. The channel may be further defined by opposing side walls and a floor 404 of the body. In some embodiments the channel is substantially circular in cross-sectional profile, and as such does not have formal walls. The face seal may be integral with the body. The channel may have a closed or sealed cavity defined within the outer wall of the body.

The channel may be completely hollow in some embodiments. Optionally, the channel may be filled with air or another gas, which does not restrict the deformation of the protruding portion into the interior cavity when under a load. In other embodiments, the channel may be partially hollow and partially filled, or may be entirely filled with a resilient material such as a rubbery foam or small unit lattice structure. By partially filled, a biasing structure (also referred to herein as a biasing agent and support structure) may be placed within the channel. The nature of the biasing structure, such as the thickness of supporting arms, may allow for control over the level of resiliency (e.g., resistance to deformation) and force by which the protruding portion reacts under load. The internal structure may be nested or layered such that initial deformation of the protruding portion is relatively easy but greater pressure exerted against the protruding portion causes greater deformation and subsequently greater resistance by the protruding portion. Further, in some embodiments, some sections of the channel may have biasing structures distributed along its length while other sections do not have a biasing structure (or have a different biasing structure). The selection of the biasing structure can allow a manufactured to control the resiliency of the protruding portion. Naturally, the thickness and material type of the protruding portion itself may be selected to control its resiliency and/or give.

In one embodiment, the channel is segmented by a series of internal walls. These walls may act like cushions that control the level of resilience and resistance to deformation of the protruding portion. The walls themselves may need to be conformable and deformable, too, and as such they may contribute to the resistance as well. Not only the thickness (and material) of the internal walls can be controlled (with thicker being more resilient and resistant), but also their number or frequency of appearance, their spacing from one another, and their physical configuration (e.g., wavy versus flat) may be controlled. As such, in one embodiment one section of the seal structure may have a different level of deformation resistance than another section along its length. Similarly, the width of the channel, the depth of the channel, and other parameters may be adjusted to fit the desired end application.

Suitable cross-sectional profiles of the protruding portion may resemble a semi-circle shape, an inverted "V" shape, or a crescent moon shape. Other, more complex shapes may be used. For example, a series of ribs or fins may extend outward along the length of the face seal surface. The protruding portion may undulate. The undulations may be a result of varying thicknesses or may simply be directional changes of a static thickness of the protruding portion. In one embodiment, the slope of the protruding portion is not less than 45 degrees relative to flat planar at any point along its cross-sectional profile. In other embodiments, the protruding portion is less than 45 degrees or somewhat flatter than the more arched variant. In one embodiment, the channel is fluidly coupled to a reservoir chamber such that a compressible gas contained in the otherwise sealed face seal serves as biasing agent or material. The size of the reservoir allows for control over the pressure/volume in the channel and therefore the biasing counterforce of the protruding portion.

The channel construction of the face seal may enable the face seal to resiliently deform against the contact surface to provide a mechanical seal. Based on the specific application for the seal structure, properties and features of the face seal may be selected to provide certain desirable deformation characteristics. For example, desirable deformation characteristics may enable the face seal to partially deform, such as compress and/or deflect, against the contact surface when under a load without fully deforming or collapsing such that the first outer surface abuts directly against the contact surface. The face seal may be configured to operate in a certain range of pressures in which the face seal deforms but maintains a clearance space between the first outer surface and the contact surface. The properties and features of the face seal that may affect the deformation characteristics include a thickness of the outer wall along the channel, cross-sectional size and shape of the channel, the presence, if any, of internal support structures that support the channel, the material properties (e.g., density, rigidity, etc.) of the outer wall, the material properties of the material within the cavity of the channel, and/or the like. For example, a circular cross-sectional shape may provide a greater level or amount of resistance to deformation (e.g., able to withstand more pressure before fully deforming or collapsing) than an elliptical or oval cross-sectional shape.

The body has an outer wall 402 that defines the first outer surface, the face seal, and the perimeter seal. In the illustrated embodiment, the outer wall extends along the entire perimeter of the body such that the outer wall defines the second outer surface, the first side surface, and the second side surface. A portion of the outer wall defines the outer contact surface of the protruding portion of the face seal. In the illustrated embodiment, the protruding portion has a curved (e.g., convex) and rounded cross-sectional shape.

Optionally, the body may include an internal wall 408 and scaffolding 410 surrounded by the outer wall. The internal wall and the scaffolding may represent an internal support structure to support the structural integrity of the sealing body during and after the manufacturing process. There may be a seam between the internal wall and the outer wall in the illustrated embodiment. For example, the internal wall and/or the scaffolding may be composed of a different type of material as the outer wall. In an alternative embodiment, the internal wall is composed of the same material as the outer wall, and there is no seam between the two layers, such that the body has a single wall and is a monolithic body. An integral monolithic body may be suited for additively manufactured face seals.

Figure 3:
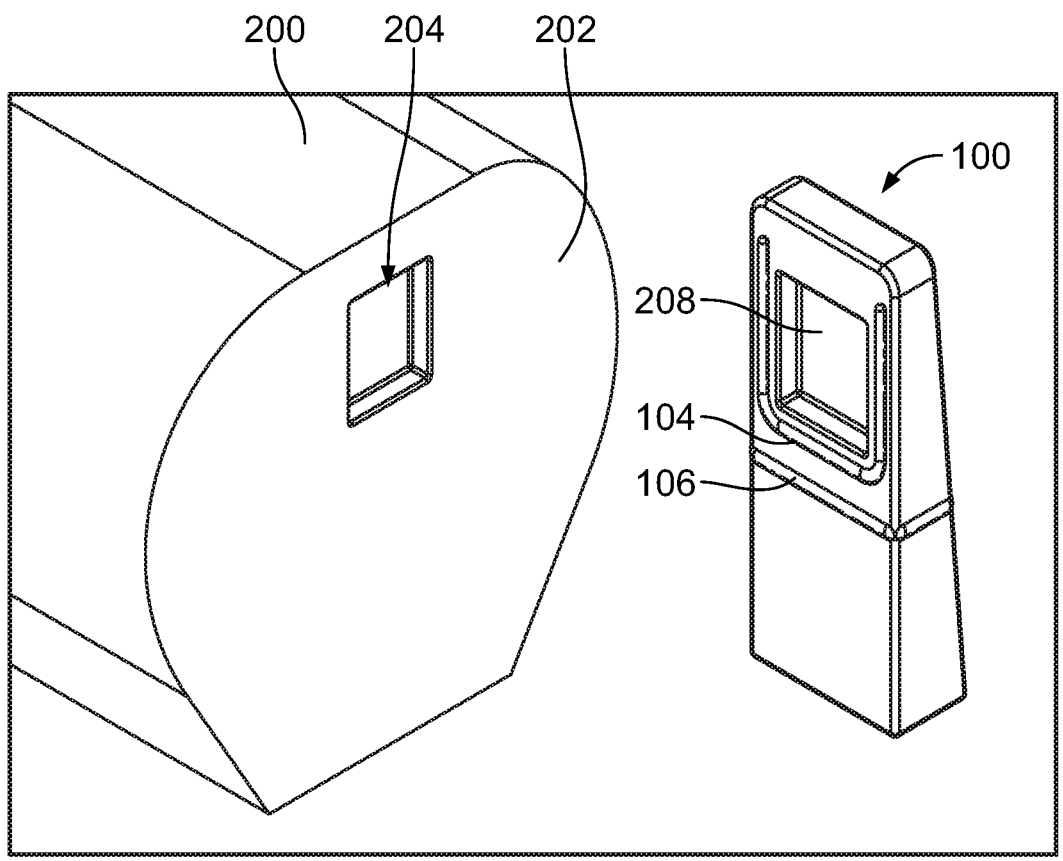
FIG. 3 is an enlarged perspective view of a portion of the seal structure shown in FIGS. 1 and 2 showing part of a face seal on a body of the seal structure.

FIG. 3 illustrates the splash guard 100 and a gear case 200 according to an example application. The splash guard may seal against a wall 202 of the gear case. The splash guard is poised for contacting the wall 202. The gear case in this embodiment is an example of a contact member, and the wall of the gear case may represent a contact surface. In the illustrated example, the splash guard is a vent plug. The gear case has an overflow opening 204 along its wall. For example, the gear case may enclose a mechanical linkage that includes gears. The gear case may be a component of a vehicle or other machinery. The gear case may contain a lubricant for the mechanical linkage, such as oil, to reduce friction and wear on the components of the linkage. The overflow opening 204 provides a port for allowing excess lubricant to escape the gear case if the gear case is overfilled. The face seal 104 of the seal structure may at least partially surround the overflow opening. The seal structure may plug or at least partially obstruct the opening to block the lubricant (e.g., oil) from splashing and/or spraying out of the opening during operation. For example, due to vibration, temperature, and/or movements of the gear case during operation, some of the lubricant liquid may splash out of the opening, even if the total amount of lubricant in the gear case is not excessive. The seal structure may be configured to function as a splash guard to block the lubricant that splashes through the opening from exiting the gear case, thereby maintaining a designated volume of oil or other lubricant within the gear case during operation. For example, the lubricant that flows through overflow opening during operation may contact the area of the first outer surface of the body. The lubricant may contact a back surface 208 of the cavity of the body and flow back into the gear case through the overflow opening.

The seal structure may be configured to be wedged against the wall of the gear case in order for the face seal to contact the wall. The perimeter seal 106 may be used to provide a friction fit for the body to wedge the body against the wall. For example, the seal structure may be configured to be inserted into a space defined by the wall 202 of the gear case and a back wall. The back wall may be a component of the gear case or another object. The friction fit secures the seal structure in a fixed position relative to the gear case that allows the face seal to align with and at least partially surround the overflow opening.

The gear case 200 represents one non-limiting application for the seal structure described herein. The embodiments of the seal structure described herein can be utilized for various applications that require a sealed interface, such as, for example, lids on containers. The seal structure may be able to withstand relatively harsh conditions, such as high and/or low temperature, humidity, high and/or low pressure, the presence of acidic and/or basic components, the presence of debris, such as dust and dirt, and/or the like. The seal structure may be able to withstand changing conditions, such as temperature increases and/or decreases, pressure increases and/or decreases, and the like. By integrating the seal into the body such that the seal is seamlessly connected to the body without the use of secondary attachment means, such as adhesives or fasteners, the seal structure is not at risk of forming leak paths between the seal and the body, even in the presence of harsh conditions and changing conditions.

Figure 4:
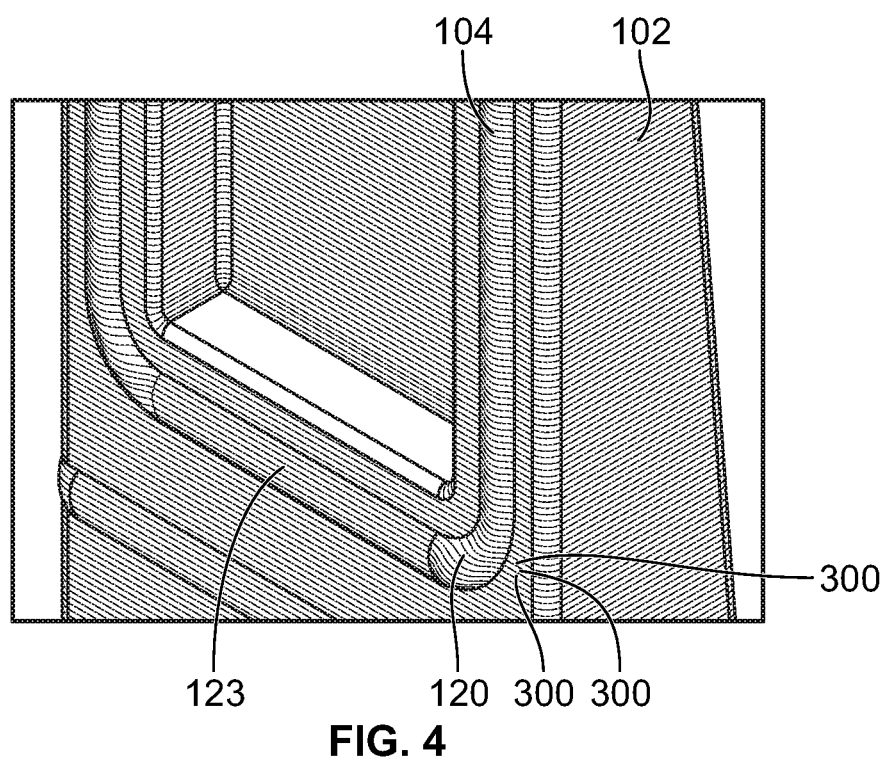
FIG. 4 is a cross-sectional view of the seal structure shown in FIG. 1.

FIG. 4 is an enlarged perspective view of a portion of the splash guard shown in FIGS. 1 through 3 showing part of the face seal 104 on the body 102. In an embodiment, the body and the face seal are composed of a stack of multiple material layers 300 fused together. For example, the seal structure may be formed from an additive manufacturing process (e.g., 3D printing), in which the structure is constructed layer by layer. In the illustrated embodiment, the layers 300 are oriented perpendicular to the long axis (e.g., the length direction) of the body. The layers may be horizontal, such as parallel to the elongated orientation of the intermediate segment 123 of the face seal.

The face seal may be formed in-situ on the body during a single additive manufacturing process that forms the body and the face seal. For example, some of the layers of material may have edge segments that represent the first outer surface and other edge segments that represent the protruding portion 120 that projects outward from the first outer surface. Thus, the face seal may be formed during the formation of the body, and the face seal is integrally, seamlessly connected to the body.

Suitable additive manufacturing processes include, for example, material extrusion [fuse deposition modeling (FDM)], vat photopolymerization [stereolithography (SLA), digital light processing (DL), continuous digital light processing (CDLP), light emission diode (LED), and/or the like], powder bed fusion [multi jet fusion (MJF), selective laser sintering (SLS), material jetting [material jetting (MJ), nanoparticle jetting (NPJ, drop on demand (DOD)], selective laser melting (DMLS/DMLM/SLM) and binder jetting (BJ). All of these processes involve depositing a layer of material on a build surface and fusing selective portions of the material using a form of energy and/or polymer binding agent that scans the surface based on a CAD pattern. The material of the seal structure may be selected based at least in part on the proposed method of additive manufacturing.

The seal structure may be formed of one or more materials, such as plastic, ceramic, metal, and/or glass. Suitable plastics may be thermoplastic or thermoset. Suitable thermoplastic materials may include one or more of polycarbonate, polyethylene, poly propylene, polyvinyl chloride, polytetrafluoroethylene (PTFE), polyvinylidene fluoride, and the like. Suitable thermoset plastic materials may include one or more of an epoxy resin, a vinyl ester, a polyester thermosetting polymer (e.g., polyethylene terephthalate (PET)), or the like. The ceramic material may include one or more of silica, alumina, silicon nitride, or the like. The metal material may include one or more of aluminum, titanium, cobalt, chrome, iron, nickel or alloys of the foregoing, and the like. Some particularly useful alloys may include stainless steel and nickel alloys. Metal based seal structures may be suited for use with higher temperature applications, such as with engines, and may help to seal exhaust gases.

The seal structure may be a composite including a mixture of multiple materials, such as a plastic with a ceramic, a ceramic with a metal (known as a cermet composite material), and/or a plastic with a metal. Optionally, the seal structure may represent a reinforced composite, such as a fiber-reinforced plastic. The fiber-reinforced plastic may include embedded fibers within a matrix layer of the plastic. The fibers may be carbon fibers, glass fibers, aramid fibers (e.g., Kevlar®), basalt fibers, naturally-occurring biological fibers such as bamboo, and/or the like. The reinforced composite may be reinforced with other shapes of material other than fibers, such as a powder or strips in other embodiments. Fibers may be oriented in the direction of the channel, perpendicular or transverse to the direction of the channel, skew or in multiple orientations depending at least in part on the intended use of the protruding portion. The reinforcements may be embedded within any of the plastics listed above. The cermet composite material may be composed of any of the ceramics and the metals listed above.

The build material for the seal structure may be selected based on application-specific considerations and/or parameters. For example, the build material may be selected such that the face seal has a desired amount of compliancy (e.g., resistance to deformation) when forced into engagement with the contact wall. The build material may be selected to withstand exposure to certain expected contaminants and/or conditions, such as water, acids, bases, high temperature, low temperatures, and the like. For example, a corrosion-resistant material may be selected as the build material for the seal structure if the seal structure is expected to be exposed to a corrosive material.

In an embodiment, the entire seal structure may be formed via a single additive manufacturing process. Therefore, the seal structure may be integrally, seamlessly connected to the body by being composed of multiple fused layers of the build material. In an alternative embodiment, the seal structure may be formed through another process other than additive manufacturing. For example, the seal structure may be molded, such as by casting, injection molding, compression molding, and/or the like. In such a molding process, the seals may be still be integral to the body, such that the seals are formed in a common molding process with the body.

Figure 5:
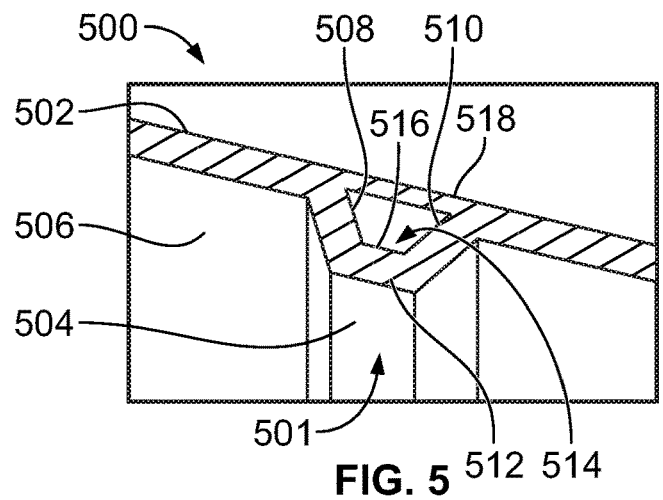
FIG. 5 is a cross-sectional view of a portion of a seal structure showing a face seal according to a first alternative embodiment.

FIG. 5 is a cross-sectional view of a portion of a seal structure 500 having a face seal 501 according to a one embodiment. The face seal is formed integrally with a body 502 of the seal structure. The face seal includes a protruding portion 504 of the body that protrudes outward from an outer surface 506 of the body. The body includes a channel 514 that is defined between an inner surface 516 of the protruding portion and a floor 518 of the body. The protruding portion here has a polygonal cross-sectional profile. To form the polygon, the protruding portion includes a first angled segment 508, a second angled segment 510, and a bridge segment 512 that connects the first angled segment to the second angled segment. The three segments 508, 510, and 512 may each be linear (e.g., planar). The second and second angled segments may be oriented at transverse angles relative to the outer surface of the body. Optionally, the first and second angled segments may have inverse (e.g., equal and opposite) angles.

The characteristics of the polygonal protruding portion may be selected based on application-specific parameters for the face seal to provide desirable sealing against a contact surface. For example, the number of linear segments in the polygonal shape of the protruding portion, the lengths of the linear segments, the thicknesses of the linear segments, the angles of the linear segment, and the like, may affect the compliancy of the face seal, and therefore may be selected to provide desired compliancy properties. The use of additive manufacturing to form the seal structure may enable the construction of complex geometries for the face seal on the body. In other embodiments, the angled segments may have different thicknesses than the bridge segment. Further, the bridge segment (or the angled segments) may have structures built into their outward facing surfaces. Examples of such structures may include ridges or projections that may run axially along the length of the face seal. Also, the bridge may be built to be collapsible in a defined manner so as to fold into itself under load. Similarly, the bridge may be built to remain parallel to the channel while the angled segments are configured to deform uniformly along their length. Controlling the thickness and arrangement of the structures allows for control over the performance of face seal under load.

Figure 6:
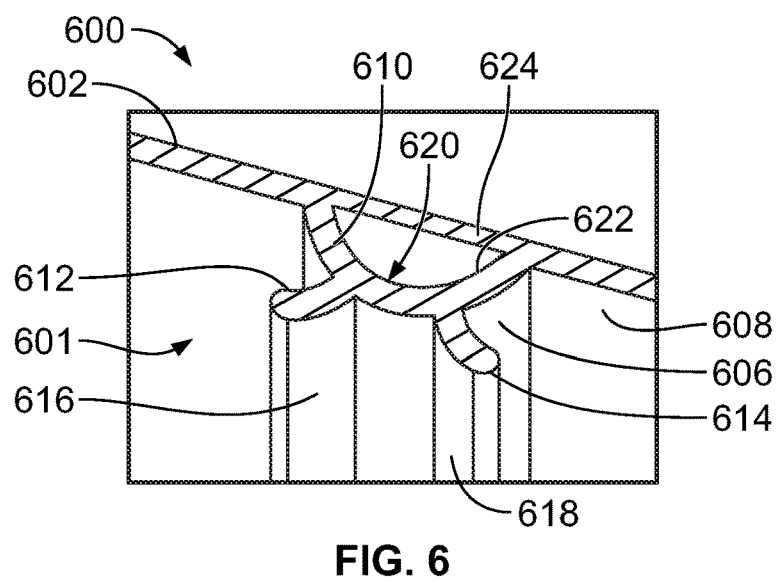
FIG. 6 is a cross-sectional view of a portion of a seal structure showing a face seal according to a second alternative embodiment.

FIG. 6 is a cross-sectional view of a portion of a seal structure 600 showing a face seal 601 according to an embodiment. This face seal may be formed integral to a body 602 of the seal structure. The face seal is defined by surfaces of the body. The face seal includes a protruding portion 606 of the body that protrudes outward from an outer surface 608 of the body. The body includes a channel 620 that is defined between an inner surface 622 of the protruding portion and a floor 624 of the body. The protruding portion of the face seal includes a curved (e.g., convex) arc 610 and multiple projections 612, 614 that extend from the arc. The projections 612, 614 in the illustrated embodiment are cantilevered fingers in cross-section and form elongated strips 616, 618, respectively, along the length of the face seal. During use, the strips and the arc may function in combination to provide a mechanical seal against a contact surface. The projections in the illustrated embodiment have different orientations relative to one another and are spaced apart from each other along the arc.

When pressed against a contact surface, the projections may deflect towards the outer surface 608 and the arc may inwardly bend or deform. The mechanical sealing interface between the face seal and the contact surface may be formed along a region between the two projections. The elongated strips may direct fluid, gases and/or particles in a desired direction. Suitable particles may include moisture droplets, dirt, dust, debris, and the like away from the sealing interface. Optionally, the projections may have specific shapes, locations, orientations, and/or sizes based on the materials that the strips are intended to block. For example, a projection that is expected to be exposed to dust may be thinner than a projection expected to be exposed to fluids. Optionally, the different projections of the face seal may have shapes, connection locations to the arc, sizes, or orientations relative to each other based at least in part on the desired end use. In the illustrated embodiment, the projections may have different connection locations and orientations but have similar shapes and sizes. The projections of the face seal may be formed integral with the rest of the seal structure using additive manufacturing techniques.

Figure 7:
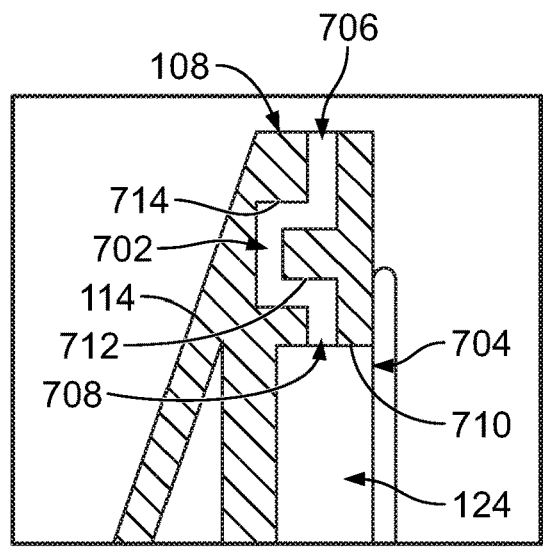
FIG. 7 is a side cross-sectional view of the seal structure shown in FIG. 1 according to one embodiment.

FIG. 7 is a side cross-sectional view of the splash guard shown in FIG. 1 according to an embodiment. The cross-section is taken along the long axis 109. In the example application in which the splash guard is a vent plug that blocks a lubricant from inadvertently being discharged through the overflow opening 204 shown in FIG. 2 during operation, the body of the seal structure may define a flow channel 702 for allowing excessive lubricant to exit the gear case even with the vent plug installed against the gear case wall. For example, due to high pressure, high temperature, over filling, and/or moving components within the gear case, some of the lubricant may need to be discharged from the gear case through the overflow opening, The vent plug may block inadvertent discharge of the lubricant due to splashing or the like, while allowing for the discharge of excessive lubricant through the flow channel 702.

The flow channel extends along a circuitous path through the vent plug from an input end 704 at the outer surface to an output end 706 of the flow channel at another surface of the vent plug. The input end 704 is defined by the cavity 124 of the body. The cavity may be fluidly connected to the flow channel at a port opening 708 defined along a side wall 710 of the cavity. From the port opening, the flow channel circuitously extends through the body, such that the flow channel is not linear. For example, the flow channel may include at least one switchback, in which a first segment 712 of the flow channel extends along a parallel and opposite orientation as a second segment 714 of the flow channel. The switchback may provide a splashguard that blocks the flow of lubricant that inadvertently splashes through the port opening. Any excessive lubricant in the gear case that is forced into the flow channel due to pressure or the like may flow through the circuitous path to the output end where the lubricant can be discharged out of the seal structure via an opening. In the illustrated embodiment, the output end 706 of the flow channel is disposed along the first (e.g., top) end 108 of the body. Alternatively, the output end may be disposed along a different surface of the body, such as the second outer surface 114 that is opposite the first outer surface that includes the face seal.

The use of additive manufacturing to form the seal structure may enable constructing the flow channel to have a complex geometry, such as the complex circuitous path through the body shown in FIG. 7, which may be difficult and/or prohibitively expensive to achieve according to the conventional processes for forming mechanical seals and/or vent plugs.

FIGS. 8 through 11 illustrate cross-sectional views of portions of seal structures according to additional embodiments. The seal structures in these additional embodiments define channels that are integral to a body. The channels are at least partially defined by an inner surface of a protruding portion of an outer surface of the body. The channels are partially hollow and contain a biasing agent. The biasing agent may include a support structure and/or a biasing material, such as a foam or a compressible fluid. The biasing agent may increase the resilience of the seal structure by urging the seal structure to a non-deformed state. For example, the biasing agent may be a resilient support that is configured to resist deformation of the protruding portion and to return the protruding portion to a non-deformed state in the absence of the load. The internal support structures may be formed in-situ with the protruding portion and the body during an additive manufacturing process.

Figure 8:
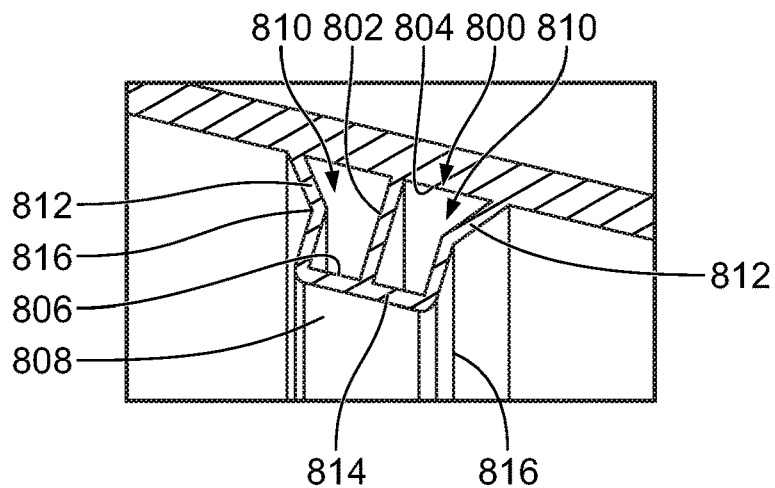
FIG. 8 illustrates a cross-section of a portion of a seal structure according to one embodiment.

FIG. 8 illustrates a cross-section of a portion of a seal structure 800 according to an embodiment. The biasing agent in FIG. 8 includes an internal center wall 802 that extends from the floor 804 of the seal structure to the inner surface 806 of the protruding portion 808. The center support wall is elongated along the length of the seal structure. The channel has multiple closed segments 810 with a different closed segment on each side of the center wall. The center wall is relatively thin and is deformable in response to deformation of the protruding portion. The center wall determines, at least in part, a level of resistance to the deformation of the protruding portion. The protruding portion may have sections with different thicknesses relative to each other. Some of the sections with different thicknesses are arranged along a perimeter length of the protruding portion. For example, the protruding portion includes two leg sections 812 that project from the outer surface and a bridge section 814 that extends between the leg sections and connects to the leg sections. The bridge section is thicker than the leg sections. The thinner leg sections may form fold lines 816 in response to application of the load to the protruding portion.

Figure 9:
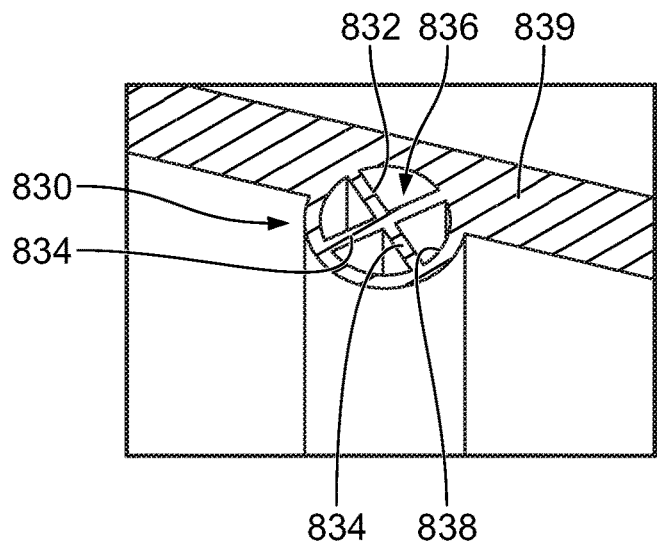
FIG. 9 illustrates a cross-section of a portion of a seal structure according to one embodiment.

FIG. 9 illustrates a cross-section of a portion of a seal structure 830 according to an embodiment. The biasing agent in FIG. 9 includes a lattice-type support frame 832 that includes intersecting support arms 834. The support arms extend across the channel 836 and connect to inner surfaces 838 of the body 839 that define the channel.

Figure 10:
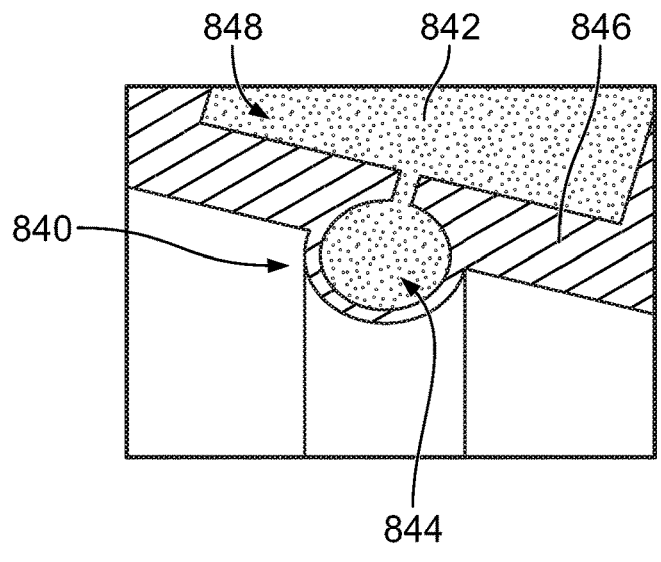
FIG. 10 illustrates a cross-section of a portion of a seal structure according to one embodiment.

FIG. 10 illustrates a cross-section of a portion of a seal structure 840 according to an embodiment. The biasing agent in FIG. 10 includes a compressible fluid 842, such as a gas or a liquid. The compressible fluid is captured within a closed cavity of the channel 844 that confines the fluid within the body 846. In the illustrated embodiment, the body includes a reservoir 848 that is fluidly coupled to the channel. The fluid is within both the channel and the reservoir. The fluid biases the protruding portion to resist deformation of the protruding portion by a determined level of resistance. The determined level of resistance may represent a range of pressures or forces that the protruding portion can withstand before entirely collapsing into the outer surface, breaking the seal with the contact surface, and/or getting damaged.

Figure 11:
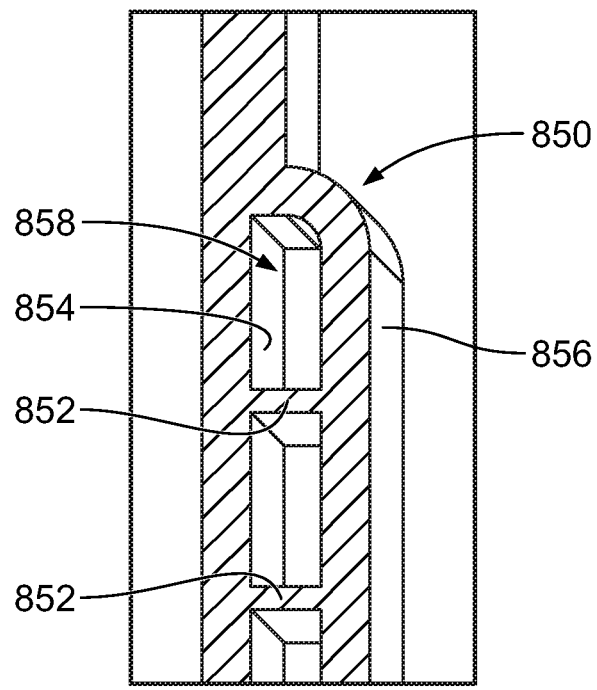
FIG. 11 illustrates a side cross-section of a portion of a seal structure according to one embodiment.

FIG. 11 illustrates a side cross-section of a portion of a seal structure 850 according to an embodiment. For example, a cross-sectional plane in FIG. 11 may be perpendicular to the cross-sectional planes shown in FIGS. 8 through 10. The biasing agent in FIG. 11 includes internal support walls 852 that extend from the floor 854 to the inner surface of the protruding portion 856. The support walls in FIG. 11 are spaced apart from one another along a length of the seal structure, and may each be oriented transverse, such as perpendicular, to the internal center wall shown in FIG. 8. The portions of the channel 858 between the support walls may be closed cavities.

Figure 12:
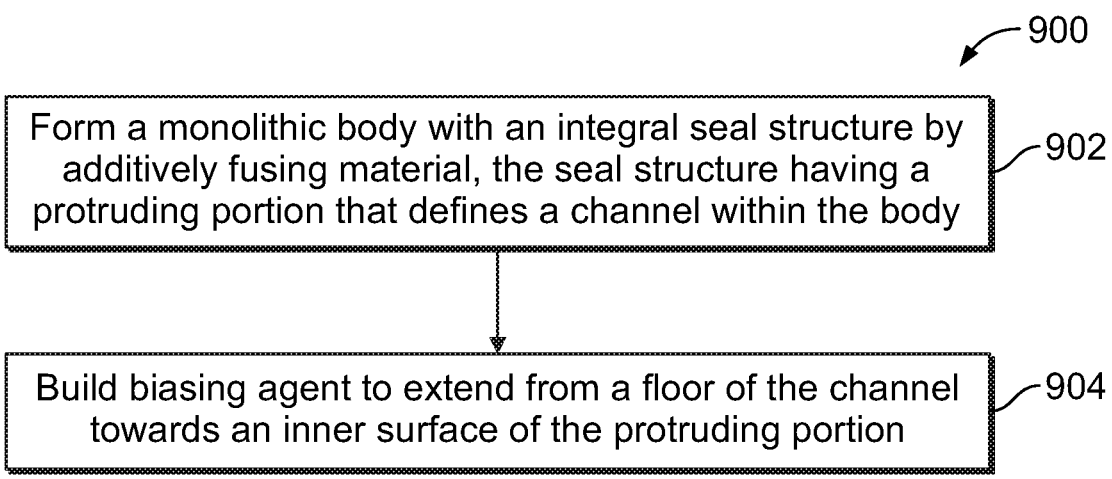
FIG. 12 is a flow chart of a method for forming a seal structure according to one embodiment.

FIG. 12 is a flow chart of a method 900 for forming a seal structure according to an embodiment. The method may form the splash guard shown in FIG. 1. Optionally, the method may include additional steps, fewer steps, and/or different steps than the illustrated flow chart. The method begins at 902, at which a monolithic body is formed with an integral seal structure by additively fusing material so that the body has an outer surface configured to face towards a contact surface of a contact member. The seal structure has at least a protruding portion outward from the outer surface of the body. The seal structure is configured to engage and at least partially deform against the contact surface of the contact member to provide a seal between the body and the contact member. An inner surface of the protruding portion defines a channel that extends under the protruding portion and within the body. The channel is a sealed volume that is filled with a biasing agent that responds to a load being applied to the protruding portion by resisting such deformation by a determined amount. Optionally, forming the monolithic body may include additive fusing material to form at least one projection that extends from the outer surface and from the protruding portion outward from the body.

At 904, a biasing agent is built to extend at least part of the way from a floor of the channel towards the inner surface of the protruding portion. The biasing agent is a resilient support disposed within the channel and is configured to resist deformation of the protruding portion and to return the protruding portion to a non-deformed state in the absence of the load. The biasing agent may be built in-situ with the body and the seal structure during the additive manufacturing process.

An additive manufacturing process may be used to form both the body and the seal, such that the seal is formed in-situ on the body while the body is being formed. A technical effect of one or more embodiments of the seal structure and method of forming the seal structure described herein may include eliminating leak paths between the seal and the body because the seal is integrally and seamlessly formed with the body. Thus, the seal cannot become dislodged from the body due to mechanical forces or pull away from the body in response to ambient conditions or aging. For example, the seal may be composed of the same build material as the body, so ambient conditions and aging may have similar effects on the seal and the body. Another technical effect of one or more embodiments may include the ability to select the characteristics of the seal, such as shape, material, thickness, orientation, projections, internal support structures, and/or the like, based on application-specific parameters. The use of additive manufacturing may enable complex geometries for the seal and the body, such as geometries that achieve the selected characteristics of the seal.

In one or more embodiments, a seal structure includes a protruding portion of an outer surface of a body and a seal structure. An inner surface of the protruding portion may define at least a portion of a channel. The protruding portion may be configured to engage and at least partially deform into the channel in response to a load generated by pressing an outer surface of the protruding portion against a contact surface of a contact member to provide a seal between the body and the contact member. The seal structure may be integrally formed within the body as a monolithic object. The body may be configured to face towards the contact surface of the contact member during operation of the seal structure.

Optionally, the protruding portion is resiliently biased against the load when in operation.

Optionally, the channel is at least partially hollow and contains a biasing material. Optionally, the biasing material includes a series of support structures that extend at least part of the way from a floor of the channel to the inner surface and/or a compressible gas captured within a closed cavity of the channel.

Optionally, the body and the seal structure are composed of a single stack of multiple layers that are fused together.

Optionally, the protruding portion has a polygonal cross-sectional shape or a rounded and convex cross-sectional shape.

Optionally, the protruding portion includes at least one projection that extends at least partially along a length of the protruding portion. Optionally, the projection is one of a plurality of projections and at least one of the projections has a different shape, a different connection location, a different size, or a different orientation relative another one of the projections. Optionally, the body, the protruding portion, and the projection are integral and monolithic, being formed of a single composition via an additive manufacturing process.

Optionally, the protruding portion has sections with different thicknesses relative to each other. Optionally, the sections with different thicknesses are arranged along a length of the protruding portion such that relatively thinner sections form fold lines in response to application of the load to the protruding portion.

Optionally, the channel has multiple closed segments with internal walls that define the closed segments, and the internal walls are deformable in response to deformation of the protruding portion. The internal walls may determine, at least in part, a level of resistance to the deformation of the protruding portion.

Optionally, the body and the protruding portion are formed from a single material and represent an integral monolithic structure without welds or seams.

Optionally, the channel is fluidly coupled to a reservoir, and the reservoir and the channel are both filled with a compressible fluid that provides a bias to the protruding portion to resist deformation of the protruding portion by a determined level of resistance.

Optionally, the channel defines at least one non-linear segment or bend along its length.

Optionally, the body is configured to mate with a gear case and thereby to form a seal and to define a path through which excess lubricant may flow out of the gear case in a controlled manner that does not allow lubricant to splash or spray out of the gear case during operation of the gear case.

In one or more embodiments, a method includes forming a monolithic body with an integral seal structure by additively fusing material so that the body has an outer surface configured to face towards a contact surface of a contact member. The seal structure may have a protruding portion that protrudes outward from the outer surface of the body. The seal structure may be configured to engage and at least partially deform against the contact surface of the contact member to provide a seal between the body and the contact member. An inner surface of the protruding portion may define a channel that extends under the protruding portion and within the body. The channel may be a sealed volume that is filled with a biasing agent. The biasing agent may be configured to respond to a load being applied to the protruding portion by resisting such deformation by a determined amount.

Optionally, forming the monolithic body includes additively fusing material to form at least one projection that extends from the outer surface and from the protruding portion that protrudes outward from the body.

Optionally, the biasing agent is a resilient support disposed within the channel and is configured to resist deformation of the protruding portion and to return the protruding portion to a non-deformed state in the absence of the load. The method may also include building the biasing agent to extend at least part of the way from a floor of the channel towards the inner surface of the protruding portion.

In one or more embodiments, a seal structure can include a body having an outer surface configured to face towards a contact surface of a contact member, a seal integral to the body such that the seal is seamlessly secured within the body to define a channel, and a protruding portion of the outer surface of the body. The seal may be configured to engage and at least partially deform against the contact surface of the contact member in response to a load and thereby to provide a seal between the body and the contact member. The body and the seal may be composed of a stack of multiple layers fused together.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A seal structure, comprising:
a body having an outer surface and a cavity having a first opening along the outer surface, the outer surface configured to engage a contact member with the first opening of the body facing and aligned with a second opening of the contact member, wherein the body also includes an integrally formed protruding portion that outwardly projects from the outer surface and at least partially surrounds the first opening into the cavity of the body, wherein an inner surface of the protruding portion defines at least a portion of a channel, the protruding portion is configured to engage the contact member and at least partially collapse into the channel while the protruding portion is pressed against the contact member to provide a seal between the body and the contact member that at least partially surrounds the second opening of the contact member and the cavity of the body,
wherein the first opening of the body is aligned with the second opening of the contact member so that one or more fluids pass between the contact member and the cavity of the body with the protruding portion inhibiting the one or more fluids from passing between the contact member and the outer surface of the body.

2. The seal structure of claim 1, wherein the channel is at least partially hollow and contains a biasing material.

3. The seal structure of claim 2, wherein the biasing material comprises a series of support structures that extend at least part of the way from a floor of the channel to the inner surface of the protruding portion.

4. The seal structure of claim 1, wherein the body and the protruding portion are composed of one or more stacks of multiple layers that are fused together.

5. The seal structure of claim 1, wherein the protruding portion has a polygonal cross-sectional shape or a rounded and convex cross-sectional shape.

6. The seal structure of claim 1, wherein the protruding portion includes at least one projection that extends at least partially along a length of the protruding portion.

7. The seal structure of claim 6, wherein the projection is one of a plurality of projections and two or more of the projections have different shapes, different connection locations, different sizes, or different orientations.

8. The seal structure of claim 1, wherein the protruding portion has sections with different thicknesses relative to each other.

9. The seal structure of claim 8, wherein the sections with the different thicknesses are arranged along a length of the protruding portion such that one or more thinner sections form fold lines in response to the protruding portion engaging the contact member.

10. The seal structure of claim 1, further comprising one or more deformable internal walls within the channel that extend from a floor of the channel to the inner surface of the protruding portion, wherein the one or more internal walls segment the channel into multiple closed segments, and the one or more internal walls flex in response to the protruding portion at least partially collapsing, wherein the one or more internal walls resist a collapse of the protruding portion.

11. The seal structure of claim 1, wherein the body and the protruding portion are formed from a single material and represent an integral monolithic structure without welds or seams.

12. The seal structure of claim 1, wherein the channel is fluidly coupled to a reservoir, and the reservoir and the channel with include a compressible fluid that resists deformation of the protruding portion.

13. The seal structure of claim 1, wherein the channel includes at least one non-linear segment or bend along its a length of the channel.

14. A vent plug comprising the seal structure of claim 1, wherein the contact member is a gear case and the body is configured to mate with the gear case to form a seal between the gear case and the body at least partially around the first opening, wherein the first opening of the body is aligned with the second opening in the gear case through which lubricant flowing out of the second opening in the gear case enters into the cavity of the body without the lubricant passing between the gear case and the seal formed by the protruding portion of the body.

15. The seal structure of claim 1, wherein the first opening has a generally rectangular shape along the outer surface with four edges, and the protruding portion surrounds the first opening along at least three of the four edges.

16. The seal structure of claim 1, wherein the cavity of the body extends from the first opening along the outer surface to a closed back wall of the body such that the cavity does not fully extend through the body.

17. A method, comprising:
forming a body with an integrally formed protruding portion by additively fusing material, the body having an outer surface and a cavity having a first opening along the outer surface, the outer surface configured to engage a contact member with the first opening of the body facing and aligned with a second opening of the contact member,
wherein the protruding portion outwardly projects from the outer surface and at least partially surrounds the first opening into the cavity of the body, an inner surface of the protruding portion defining at least a portion of a channel, wherein the protruding portion is configured to engage the contact member and at least partially collapse into the channel while the protruding portion is pressed against the contact member to provide a seal between the body and the contact member that at least partially surrounds the second opening of the contact member and the cavity of the body,
wherein the body is formed for the first opening of the body to align with the second opening of the contact member so that one or more fluids pass between the contact member and the cavity of the body with the protruding portion inhibiting the one or more fluids from passing between the contact member and the outer surface of the body.

18. The method of claim 17, wherein forming the body further comprises additively fusing material to form at least one projection that extends from the protruding portion.

19. The method of claim 17, wherein the biasing agent includes one or more support members disposed within the channel and the method further comprises building the one or more support members, during the forming of the body, to extend from a floor of the channel to the inner surface of the protruding portion.

20. A seal structure, comprising:
a body having an outer surface and a cavity having a first opening along the outer surface, the outer surface configured to engage a contact member with the first opening of the body facing and aligned with a second opening of the contact member, the first opening having a generally rectangular shape along the outer surface with four edges,
wherein the body also includes an integrally formed protruding portion that outwardly projects from the outer surface and surrounds the first opening into the cavity along at least three of the four edges, an inner surface of the protruding portion defining at least a portion of a channel, the protruding portion configured to engage the contact member and at least partially collapse into the channel while the protruding portion is pressed against the contact member to provide a seal between the body and the contact member that at least partially surrounds the second opening of the contact member and the cavity of the body,
wherein the body and the seal are composed of one or more stacks of material layers fused together.

* * * * *